(12) United States Patent
Liu et al.

(10) Patent No.: US 9,778,804 B2
(45) Date of Patent: Oct. 3, 2017

(54) CALIBRATING CHARGE MISMATCH IN A BASELINE CORRECTION CIRCUIT

(71) Applicant: SYNAPTICS INCORPORATED, San Jose, CA (US)

(72) Inventors: Chunbo Liu, San Jose, CA (US); Rafael Betancourt, Santa Clara, CA (US); Tae-Song Chung, San Jose, CA (US); Steve Chikin Lo, Sunnyvale, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 78 days.

(21) Appl. No.: 14/731,385

(22) Filed: Jun. 4, 2015

(65) Prior Publication Data

US 2016/0357299 A1    Dec. 8, 2016

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01); *G06F 2203/04108* (2013.01)

(58) Field of Classification Search
CPC .... G06F 3/044; G06F 3/03547; G06F 3/0416; G06F 2203/04104; G06F 1/3203
See application file for complete search history.

(56) References Cited

U.S. PATENT DOCUMENTS

| | | | |
|---|---|---|---|
| 6,590,799 B1 | 7/2003 | Rickes et al. | |
| 6,714,469 B2 | 3/2004 | Rickes et al. | |
| 8,575,947 B1 * | 11/2013 | Walsh | G06F 3/044 324/658 |
| 2008/0048997 A1 * | 2/2008 | Gillespie | G06F 3/03547 345/174 |
| 2010/0127717 A1 * | 5/2010 | Cordeiro | G06F 3/0416 324/678 |
| 2011/0062974 A1 | 3/2011 | Day et al. | |
| 2011/0115717 A1 | 5/2011 | Hable et al. | |
| 2012/0043970 A1 * | 2/2012 | Olson | G01R 27/2605 324/601 |
| 2012/0043977 A1 | 2/2012 | Kremin et al. | |
| 2012/0049868 A1 | 3/2012 | Maharyta | |

(Continued)

FOREIGN PATENT DOCUMENTS

| | | |
|---|---|---|
| WO | 2010111668 A1 | 9/2010 |
| WO | 2012143752 A2 | 10/2012 |

*Primary Examiner* — Gerald Johnson
(74) *Attorney, Agent, or Firm* — Patterson + Sheridan, LLP

(57) ABSTRACT

Various embodiments provide a processing module that calibrates a current-mode baseline correction system to account for features in an input device that lead to "offset" in output of a charge integrator used for sensing presence of an input object. The offset is a difference between a common mode voltage, which is the average voltage output of the charge integrator over a sensing cycle and a mid-rail voltage midway between high and low power supply voltages. Calibration is performed by adjusting an N-side and/or P-side current flow duration parameter until common mode voltage falls within a low offset window in which the offset is deemed to be sufficiently close to the mid-rail voltage. The resulting duration parameters are stored and used for current-mode baseline corrections when operating an associated sensor electrode for capacitive sensing.

19 Claims, 9 Drawing Sheets

(56) References Cited

U.S. PATENT DOCUMENTS

| | | |
|---|---|---|
| 2012/0229418 A1 | 9/2012 | Schwartz et al. |
| 2012/0280744 A1 | 11/2012 | Hsieh |
| 2013/0063395 A1 | 3/2013 | Byun et al. |
| 2014/0278173 A1 | 9/2014 | Elia et al. |
| 2014/0347306 A1* | 11/2014 | Krah .................... G06F 1/3203 345/173 |
| 2016/0054829 A1* | 2/2016 | Ellis .................... G06F 3/0416 345/178 |

* cited by examiner

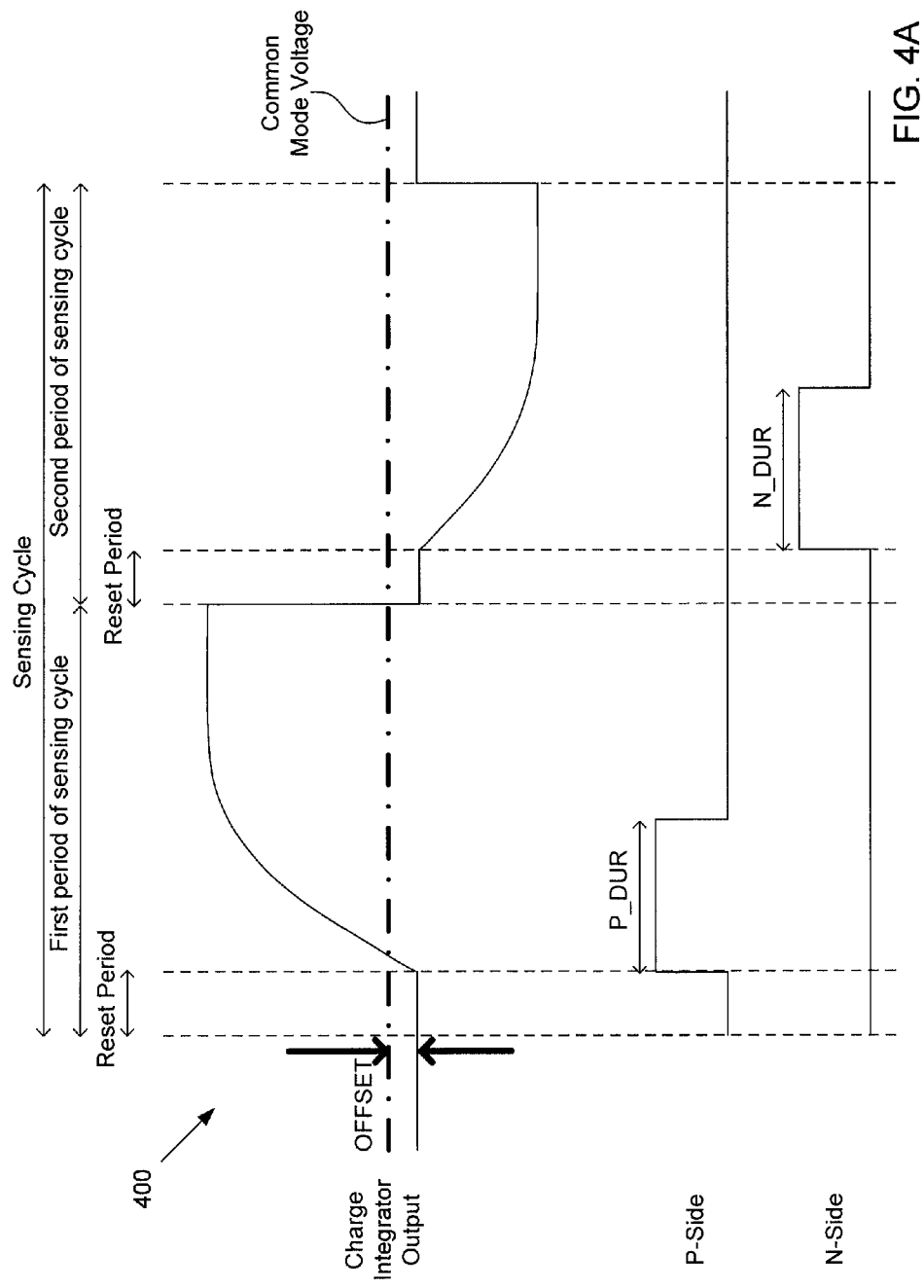

CALIBRATING CHARGE MISMATCH IN A BASELINE CORRECTION CIRCUIT

BACKGROUND

Field of the Disclosure

Embodiments generally relate to input sensing and, in particular, to calibrating charge mismatch in a baseline correction circuit.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Such input devices include sensor electrodes that are driven with a signal for capacitive sensing. Processing circuitry processes the signal received from the sensor electrodes in order to determine capacitance of the sensor electrodes. A change in capacitance of the sensor electrodes indicates presence or absence of an input object proximate to a sensor electrode as well as location of the input object.

Sensor electrodes form "capacitive pixels" with each other or with other elements such as input objects. Each capacitive pixel has an associated baseline measurement, which is a measurement from the capacitive pixel that a processing system measures with no input object in the sensing region. An input device performs baselining operations to account for variations or defects in the input device that may cause these baseline measurements to deviate from what is desired.

Baseline correction is usually achieved by adding or subtracting a certain amount of the charge received by processing circuitry when an associated sensor electrode is driven for capacitive sensing, such that an expected nominal output is obtained from the processing circuitry. One type of baseline operation, a current-mode baseline operation, adjusts the amount of current over a certain duration of time. Because of variations in manufacturing processes related to the baseline circuitry, current-mode baseline operations may introduce a "common mode voltage offset" into a signal associated with the processing circuitry. A common mode voltage offset is a difference between the average of the output signal over a sensing cycle and a value that is deemed to be a "zeroed" value (such as a mid-rail voltage). This common mode voltage offset results in a reduced dynamic range of the processing circuitry, which may reduce the range of input signals over which the input device may operate, thus reducing the ability to sense the presence of an input object.

SUMMARY

A processing system for calibrating current-mode baseline operations is provided. The processing system includes a charge integrator coupled to a sensor electrode configured to be driven with a sensing signal for capacitive sensing. The processing system also includes a baseline unit configured to flow first current to the charge integrator for a first duration during a first period of a cycle of the sensing signal and to flow second current to the charge integrator for a second duration during a second period of the cycle of the sensing signal. The processing system further includes a calibration unit configured to determine values for one or more of the first duration and the second duration at which a common mode voltage of the charge integrator is within a prescribed range.

A method for calibrating current-mode baseline operations is also provided. The method includes driving a sensor electrode coupled to a charge integrator with a signal. The method also includes flowing first current to the charge integrator for a first duration during a first period of a cycle of the sensing signal. The method further includes flowing second current to the charge integrator for a second duration during a second period of the cycle of the sensing signal. The method also includes determining values for one or more of the first duration and the second duration at which a common mode voltage of the charge integrator is within a prescribed range.

An input device is also provided. The input device includes a plurality of sensor electrodes configured to be driven for capacitive sensing. The input device also includes a processing system. The processing system includes a charge integrator coupled to a sensor electrode of the plurality of sensor electrodes configured to be driven with a sensing signal for capacitive sensing. The processing system also includes a baseline unit configured to flow first current to the charge integrator for a first duration during a first period of a cycle of the sensing signal and to flow second current to the charge integrator for a second duration during a second period of the cycle of the sensing signal. The processing system further includes a calibration unit configured to determine values for one or more of the first duration and the second duration at which a common mode voltage of the charge integrator is within a prescribed range.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other effective embodiments may be admitted.

FIGS. 4A and 4B illustrate graphs that show the effect of varying current flow duration parameters in the context of performing capacitive sensing, according to an example.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following Various embodiments provide a processing module that calibrates a current-mode baseline correction system to account for features in an input device that lead to "offset" in output of a charge integrator used for sensing presence of an input object. In some embodiments, the offset is a difference between a common mode voltage, which is the average voltage output of the charge integrator over a sensing cycle and a mid-rail voltage midway between high and low power supply voltages. Calibration may be performed by adjusting an N-side and/or P-side current flow duration parameter until common mode voltage falls within a low offset window in which the offset is deemed to be sufficiently close to the mid-rail voltage. The resulting duration parameters are stored and used for current-mode baseline corrections when operating an associated sensor electrode for capacitive sensing. Because the offset described above contributes to reduced dynamic range of sensing circuitry, the disclosed embodiments improve the dynamic range of the capacitive sensing system.

Figure 1:
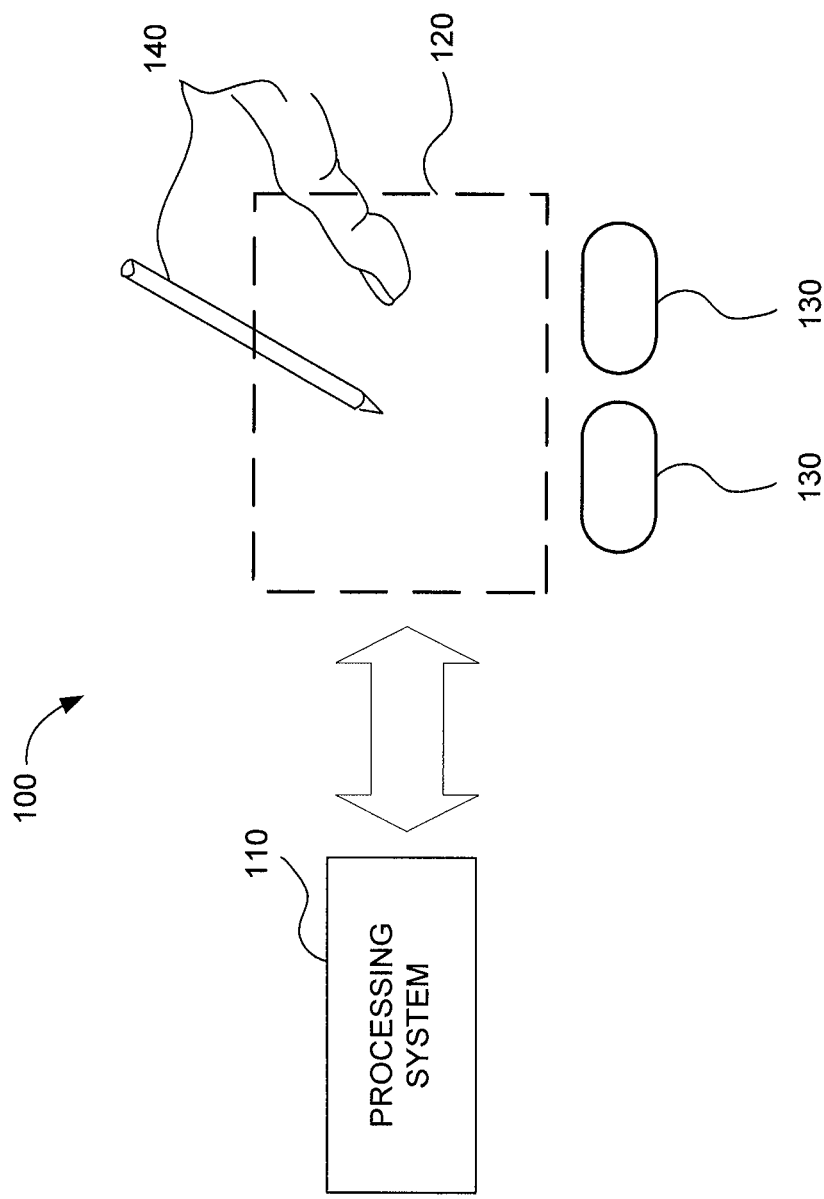
FIG. 1 is a block diagram of a system that includes an input device according to an example.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
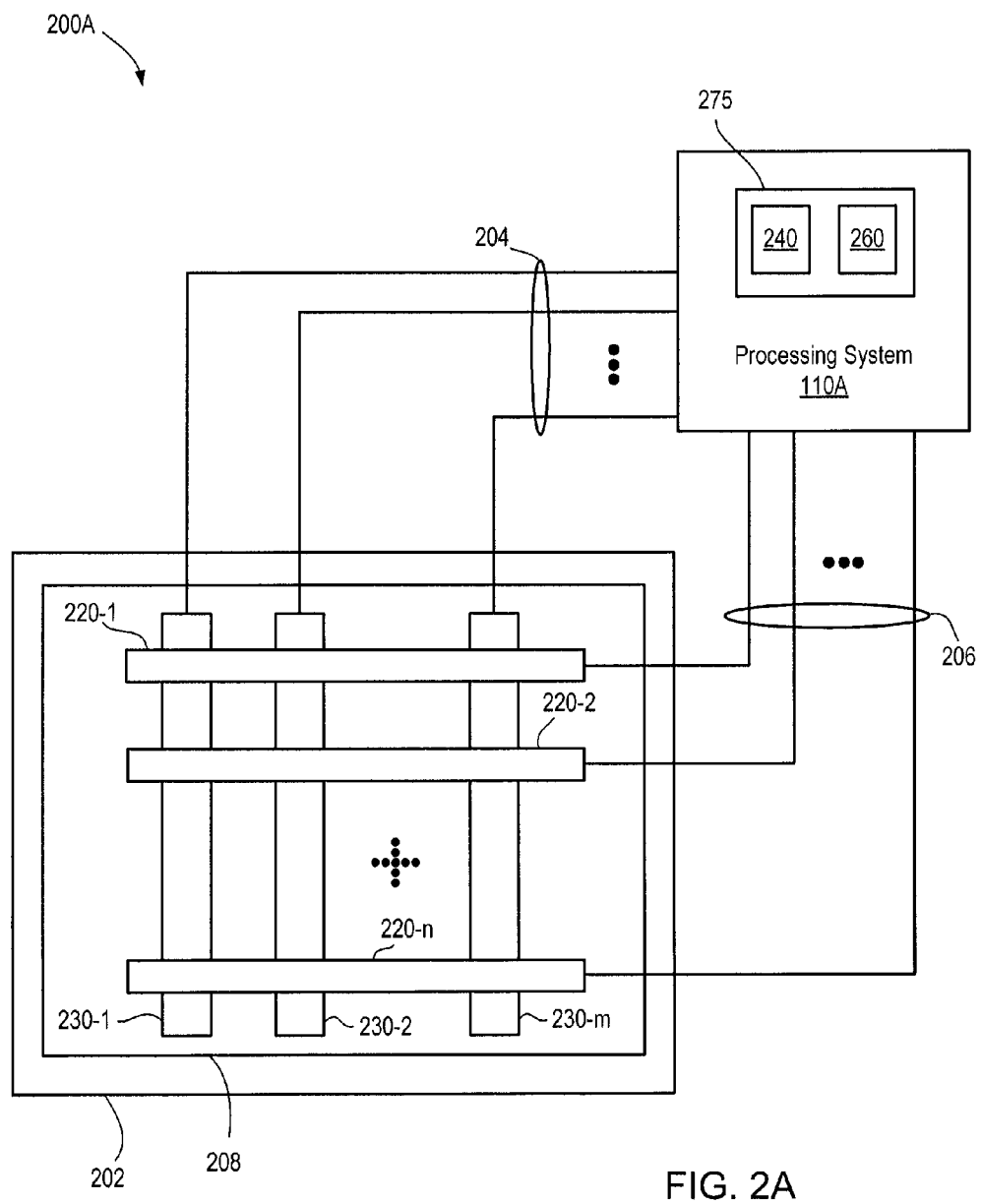
FIG. 2A is a block diagram depicting a capacitive sensor device according to an example.

FIG. 2A is a block diagram depicting a capacitive sensor device 200A according to an example. The capacitive sensor device 200A comprises an example implementation of the input device 100 shown in FIG. 1. The capacitive sensor device 200A includes a sensor electrode collection 208 coupled to an example implementation of the processing system 110 (referred to as "the processing system 110A"). As used herein, general reference to the processing system 110 is a reference to the processing system described in FIG. 1 or any other embodiment thereof described herein (e.g., the processing system 110A, 110B, etc.).

The sensor electrode collection 208 is disposed on a substrate 202 to provide the sensing region 120. The sensor electrode collection 208 includes sensor electrodes disposed on the substrate 202. In the present example, the sensor electrode collection 208 includes two pluralities of sensor electrodes 220-1 through 220-N (collectively "sensor electrodes 220"), and 230-1 through 230-M (collectively "sensor electrodes 230"), where M and N are integers greater than zero. The sensor electrodes 220 and 230 are separated by a dielectric (not shown). The sensor electrodes 220 and the sensor electrodes 230 can be non-parallel. In an example, the sensor electrodes 220 are disposed orthogonally with the sensor electrodes 230.

In some examples, the sensor electrodes 220 and the sensor electrodes 230 can be disposed on separate layers of the substrate 202. In other examples, the sensor electrodes 220 and the sensor electrodes 230 can be disposed on a single layer of the substrate 202. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

In the present example, the sensor electrode collection 208 is shown with the sensor electrodes 220, 230 generally arranged in a rectangular grid of intersections of orthogonal sensor electrodes. It is to be understood that the sensor electrode collection 208 is not limited to such an arrangement, but instead can include numerous sensor patterns. Although the sensor electrode collection 208 is depicted as rectangular, the sensor electrode collection 208 can have other shapes, such as a circular shape.

As discussed below, the processing system 110A can operate the sensor electrodes 220, 230 according to a plurality of excitation schemes, including excitation scheme(s) for mutual capacitance sensing ("transcapacitive sensing") and/or self-capacitance sensing ("absolute capacitive sensing"). In a transcapacitive excitation scheme, the processing system 110A drives the sensor electrodes 230 with transmitter signals (the sensor electrodes 230 are "transmitter electrodes"), and receives resulting signals from the sensor electrodes 220 (the sensor electrodes 220 are "receiver electrodes"). In some embodiments, sensor electrodes 220 may be transmitter electrodes and sensor electrodes 230 may be receiver electrodes. The sensor electrodes 230 can have the same or different geometry as the sensor electrodes 220. In an example, the sensor electrodes 230 are wider and more closely distributed than the sensor electrodes 220, which are thinner and more sparsely distributed. Similarly, in an embodiment, sensor electrodes 220 may be wider and/or more sparsely distributed. Alternatively, the sensor electrodes 220, 230 can have the same width and/or the same distribution.

The sensor electrodes 220 and the sensor electrodes 230 are coupled to the processing system 110A by conductive routing traces 204 and conductive routing traces 206, respectively. The processing system 110A is coupled to the sensor electrodes 220, 230 through the conductive routing traces 204, 206 to implement the sensing region 120 for sensing inputs. Each of the sensor electrodes 220 can be coupled to at least one routing trace of the routing traces 206. Likewise, each of the sensor electrodes 230 can be coupled to at least one routing trace of the routing traces 204.

Figure 2B:
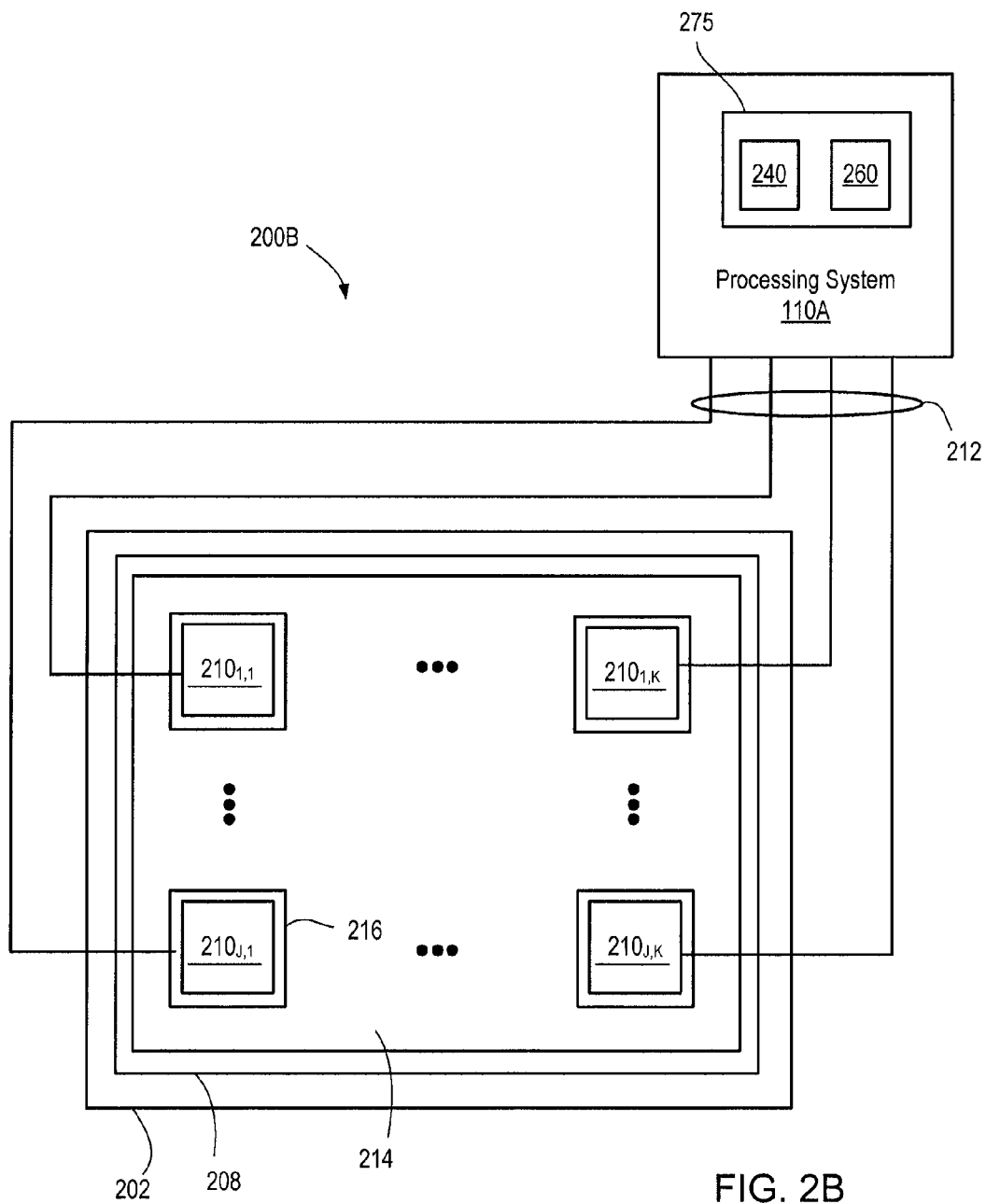
FIG. 2B is a block diagram depicting another capacitive sensor device according to an example.

FIG. 2B is a block diagram depicting a capacitive sensor device 200B according to an example. The capacitive sensor device 200B comprises another example implementation of the input device 100 shown in FIG. 1. In the present example, the sensor electrode collection 208 includes a plurality of sensor electrodes $210_{1,1}$ through $210_{J,K}$, where J and K are integers (collectively "sensor electrodes 210"). The sensor electrodes 210 are capacitively coupled to a grid electrode 214. The sensor electrodes 210 are ohmically isolated from each other and the grid electrode 214. The sensor electrodes 210 can be separated from the grid electrode 214 by a gap 216. In the present example, the sensor electrodes 210 are arranged in a rectangular matrix pattern, where at least one of J or K is greater than zero. The sensor electrodes 210 can be arranged in other patterns, such as polar arrays, repeating patterns, non-repeating patterns, or like type arrangements. Similar to the capacitive sensor device 200A, the processing system 110A can operate the sensor electrodes 210 and the grid electrode 214 according to a plurality of excitation schemes, including excitation scheme(s) for transcapacitive sensing and/or absolute capacitive sensing.

In some examples, the sensor electrodes 210 and the grid electrode 214 can be disposed on separate layers of the substrate 202. In other examples, the sensor electrodes 210 and the grid electrode 214 can be disposed on a single layer of the substrate 202. The sensor electrodes 210 can be on the same and/or different layers as the sensor electrodes 220 and the sensor electrodes 230. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

The sensor electrodes 210 are coupled to the processing system 110A by conductive routing traces 212. The processing system 110A can also be coupled to the grid electrode 214 through one or more routing traces (not shown for clarity). The processing system 110A is coupled to the sensor electrodes 210 through the conductive routing traces 212 to implement the sensing region 120 for sensing inputs.

Referring to FIGS. 2A and 2B, the capacitive sensor device 200A or 200B can be utilized to communicate user input (e.g., a user's finger, a probe such as a stylus, and/or some other external input object) to an electronic system (e.g., computing device or other electronic device). For example, the capacitive sensor device 200A or 200B can be implemented as a capacitive touch screen device that can be placed over an underlying image or information display device (not shown). In this manner, a user would view the underlying image or information display by looking through substantially transparent elements in the sensor electrode collection 208. When implemented in a touch screen, the substrate 202 can include at least one substantially transparent layer (not shown). The sensor electrodes and the conductive routing traces can be formed of substantially transparent conductive material. Indium tin oxide (ITO) and/or thin, barely visible wires are but two of many possible examples of substantially transparent material that can be used to form the sensor electrodes and/or the conductive routing traces. In other examples, the conductive routing traces can be formed of non-transparent material, and then hidden in a border region (not shown) of the sensor electrode collection 208.

In another example, the capacitive sensor device 200A or 200B can be implemented as a capacitive touchpad, slider, button, or other capacitance sensor. For example, the substrate 202 can be implemented with, but not limited to, one or more clear or opaque materials. Likewise, clear or opaque conductive materials can be utilized to form sensor electrodes and/or conductive routing traces for the sensor electrode collection 208.

In general, the processing system 110A excites or drives sensing elements of the sensor electrode collection 208 with a sensing signal and measures an induced or resulting signal that includes the sensing signal and effects of input in the sensing region 120. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. A sensing signal can be constant, substantially constant, or varying over time, and generally includes a shape, frequency, amplitude, and phase. A sensing signal can be referred to as an "active signal" as opposed to a "passive signal," such as a ground signal or other reference signal. A sensing signal can also be referred to as a "transmitter signal" when used in transcapacitive sensing, or an "absolute sensing signal" or "modulated signal" when used in absolute sensing.

In an example, the processing system 110A drives sensing element(s) of the sensor electrode collection 208 with a voltage and senses resulting respective charge on sensing element(s). That is, the sensing signal is a voltage signal and the resulting signal is a charge signal (e.g., a signal indicative of accumulated charge, such as an integrated current signal). Capacitance is proportional to applied voltage and inversely proportional to accumulated charge. The processing system 110A can determine measurement(s) of capacitance from the sensed charge. In another example, the processing system 110A drives sensing element(s) of the sensor electrode collection 208 with charge and senses resulting respective voltage on sensing element(s). That is, the sensing signal is a signal to cause accumulation of charge (e.g., current signal) and the resulting signal is a voltage signal. The processing system 110A can determine measurement(s) of capacitance from the sensed voltage. In general, the term "sensing signal" is meant to encompass both driving voltage to sense charge and driving charge to sense voltage, as well as any other type of signal that can be used to obtain indicia of capacitance. "Indicia of capacitance" include measurements of charge, current, voltage, and the like, from which capacitance can be derived.

The processing system 110A can include a sensor module 240 and a determination module 260. The sensor module 240 and the determination module 260 comprise modules that perform different functions of the processing system 110A. In other examples, different configurations of one or more modules can perform the functions described herein. The sensor module 240 and the determination module 260 can include circuitry 275 and can also include firmware, software, or a combination thereof operating in cooperation with the circuitry 275.

The sensor module 240 selectively drives sensing signal (s) on one or more sensing elements of the sensor electrode collection 208 over one or more cycles ("excitation cycles") in accordance with one or more schemes ("excitation schemes"). During each excitation cycle, the sensor module 240 can selectively sense resulting signal(s) from one or more sensing elements of the sensor electrode collection 208. Each excitation cycle has an associated time period during which sensing signals are driven and resulting signals measured.

In one type of excitation scheme, the sensor module 240 can selectively drive sensing elements of the sensor electrode collection 208 for absolute capacitive sensing. In absolute capacitive sensing, the sensor module 240 drives selected sensing element(s) with an absolute sensing signal and senses resulting signal(s) from the selected sensing element(s). In such an excitation scheme, measurements of absolute capacitance between the selected sensing element (s) and input object(s) are determined from the resulting signal(s). In an example, the sensor module 240 can drive selected sensor electrodes 220, and/or selected sensor electrodes 230, with an absolute sensing signal. In another example, the sensor module 240 can drive selected sensor electrodes 210 with an absolute sensing signal.

In another type of excitation scheme, the sensor module 240 can selectively drive sensing elements of the sensor electrode collection 208 for transcapacitive sensing. In transcapacitive sensing, the sensor module 240 drives selected transmitter sensor electrodes with transmitter signal(s) and senses resulting signals from selected receiver sensor electrodes. In such an excitation scheme, measurements of transcapacitance between transmitter and receiver electrodes are determined from the resulting signals. In an example, the sensor module 240 can drive the sensor electrodes 230 with transmitter signal(s) and receive resulting signals on the sensor electrodes 220. In another example, the sensor module 240 can drive selected sensor electrodes 210 with transmitter signal(s), and receive resulting signals from others of the sensor electrodes 210.

In any excitation cycle, the sensor module 240 can drive sensing elements of the sensor electrode collection 208 with other signals, including reference signals and guard signals. That is, those sensing elements of the sensor electrode collection 208 that are not driven with a sensing signal, or sensed to receive resulting signals, can be driven with a reference signal, a guard signal, or left floating (i.e., not driven with any signal). A reference signal can be a ground signal (e.g., system ground) or any other constant or substantially constant voltage signal. A guard signal can be a signal that is similar or the same in at least one of shape, amplitude, frequency, or phase of a transmitter signal.

"System ground" may indicate a common voltage shared by system components. For example, a capacitive sensing system of a mobile phone can, at times, be referenced to a system ground provided by the phone's power source (e.g., a charger or battery). The system ground may not be fixed relative to earth or any other reference. For example, a mobile phone on a table usually has a floating system ground. A mobile phone being held by a person who is strongly coupled to earth ground through free space may be grounded relative to the person, but the person-ground may be varying relative to earth ground. In many systems, the system ground is connected to, or provided by, the largest area electrode in the system. The capacitive sensor device 200A or 200B can be located proximate to such a system ground electrode (e.g., located above a ground plane or backplane).

The determination module 260 performs capacitance measurements based on resulting signals obtained by the sensor module 240. The capacitance measurements can include changes in capacitive couplings between elements (also referred to as "changes in capacitance"). For example, the determination module 260 can determine baseline measurements of capacitive couplings between elements without the presence of input object(s). The determination module 260 can then combine the baseline measurements of capacitive couplings with measurements of capacitive couplings in the presence of input object(s) to determine changes in capacitive couplings.

In an example, the determination module 260 can perform a plurality of capacitance measurements associated with specific portions of the sensing region 120 as "capacitive pixels" to create a "capacitive image" or "capacitive frame." A capacitive pixel of a capacitive image represents a location within the sensing region 120 in which a capacitive coupling can be measured using sensing elements of the sensor electrode collection 208. For example, a capacitive pixel can correspond to a transcapacitive coupling between a sensor electrode 220 and a sensor electrode 230 affected by input object(s). In another example, a capacitive pixel can correspond to an absolute capacitance of a sensor electrode 210. The determination module 260 can determine an array of capacitive coupling changes using the resulting signals obtained by the sensor module 240 to produce an x-by-y array of capacitive pixels that form a capacitive image. The capacitive image can be obtained using transcapacitive sensing (e.g., transcapacitive image), or obtained using absolute capacitive sensing (e.g., absolute capacitive image). In this manner, the processing system 110A can capture a capacitive image that is a snapshot of the response measured in relation to input object(s) in the sensing region 120. A given capacitive image can include all of the capacitive pixels in the sensing region, or only a subset of the capacitive pixels.

In another example, the determination module 260 can perform a plurality of capacitance measurements associated with a particular axis of the sensing region 120 to create a "capacitive profile" along that axis. For example, the determination module 260 can determine an array of absolute capacitive coupling changes along an axis defined by the sensor electrodes 220 and/or the sensor electrodes 230 to produce capacitive profile(s). The array of capacitive coupling changes can include a number of points less than or equal to the number of sensor electrodes along the given axis.

Measurement(s) of capacitance by the processing system 110A, such as capacitive image(s) or capacitive profile(s), enable the sensing of contact, hovering, or other user input with respect to the formed sensing regions by the sensor electrode collection 208. The determination module 260 can utilize the measurements of capacitance to determine positional information with respect to a user input relative to the sensing regions formed by the sensor electrode collection 208. The determination module 260 can additionally or alternatively use such measurement(s) to determine input object size and/or input object type. While FIG. 2A and FIG. 2B illustrate several example embodiments, it is to be understood that the system and method described herein can be used in a variety of additional embodiments which utilize capacitive sensing.

Figure 3:
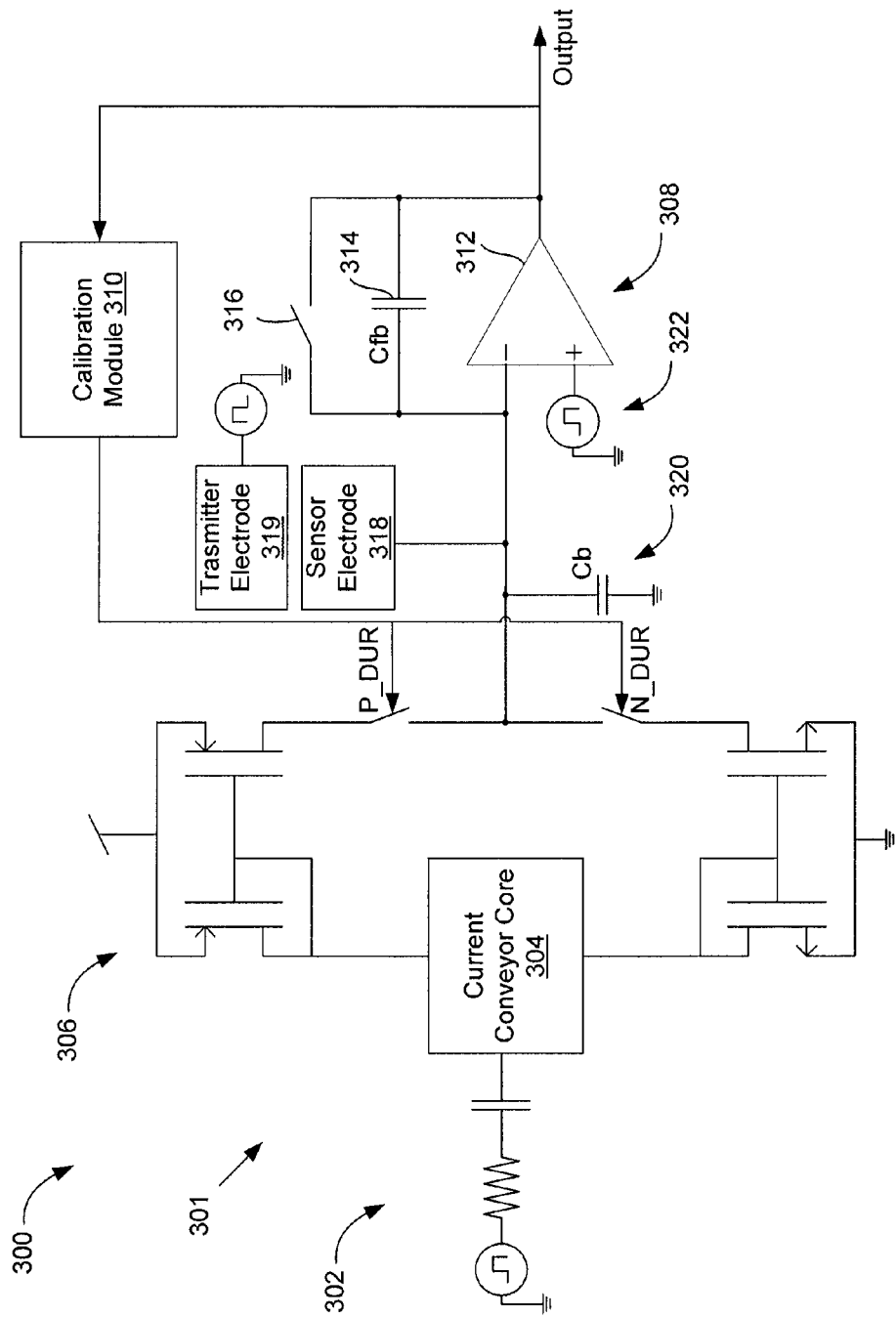
FIG. 3 is a schematic diagram of a processing module for processing signals received from a sensor electrode, according to an example.

FIG. 3 is an illustration of a processing module 300 for processing signals received from a sensor electrode 318, according to an example. The processing module 300 may be partially or fully included in processing system 110 of FIGS. 1-2B. The processing module 300 includes a current-mode baseline system 301, a charge integrator 308, and a calibration module 310. Current-mode baseline system 301 includes a current reference 302, a current conveyor core 304, and a current mirror 306 with NMOS transistors coupled to ground and PMOS transistors coupled to power supply. The charge integrator 308 includes an operational amplifier 312, a feedback capacitor 314 and a reset switch 316. A transmitter electrode 319 is illustrated and operates to drive sensor electrode 318 with a signal when operating in transcapacitive sensing mode. In absolute sensing mode, signal generator 322 drives a signal onto non-inverting input of operational amplifier 312 to drive sensor electrode 318 for capacitive sensing. Calibration module 310 receives output from charge integrator 308 and adjusts timings (also referred to herein as "duration parameters," or individually as a P-type duration parameter "P_DUR" and an N-type duration parameter "N_DUR") for the current-mode baseline system 301. Background capacitance 320 is represented by the capacitor marked "Cb" and represents environmental capacitance (e.g., capacitance to other elements of input device 100 or of environmental objects for which capacitive sensing is not being performed). This background capacitance 320 is one of the factors that baselining accounts for.

Processing module 300 operates in one of two modes: a sensing mode and a calibration mode. In the sensing mode, current-mode baseline system 301 adds or removes current from charge integrator 308 (at the inverting input) to perform baseline operations while processing system 110 drives sensor electrode 318 for capacitive sensing. Calibration module 310 sets the amount of current flowed by current mirror 306 via P_DUR switch and N_DUR switch based on associated P_DUR and N_DUR parameters. In the calibration mode, calibration module 310 works in conjunction with current-mode baseline system 301 to determine the P_DUR and N_DUR parameters to be used during sensing mode. The calibration mode may be triggered by powering input device 100 on. Alternatively, the calibration mode may be performed any time a calibration is desired.

In greater detail, in the sensing mode, transmitter electrode 319 or signal generator generates a driving signal to induce a signal in sensor electrode 318. This signal causes a current flow at the inverting input of operational amplifier 312. Without baselining, the current flow when no input object 140 is near sensor electrode 318 would be dominated by the background capacitance or sensor capacitance and make the input device 100 insensitive to the small capacitance change induced by an input object 140. An ideal baseline system would effectively remove background or sensor capacitance, and perfectly "center" the output when no input object 140 is near. The correction is usually not ideal for a variety of reasons, including variation in sensor electrode electrical or physical characteristics such as transistor mismatch across input device 100, switch charge injection, charge integrator offset, or for other reasons. Current-mode baseline system 301 adjusts for these variations, so that the output from charge integrator 308 when no input object 140 is present is an expected value and is thus considered to be baselined. Current-mode baseline system 301 makes these adjustments by flowing additional charge to or from charge integrator 308 during an appropriate portion of the sensing cycle. Related timing details, including an explanation of sensing cycles, are discussed in further detail with respect to FIG. 4.

Current-mode baseline system 301 includes several components for flowing charge in this manner. A current reference 302 generates a reference current by applying a signal to a capacitor in series with a resistor. Current conveyor core 304 receives this reference current as input and replicates and amplifies the reference current to current mirror 306. Although a current conveyor core 304 is shown, other circuits may be used to replicate the reference current for use in baselining different sensor electrodes 318. Current mirror includes a P-side output and an N-side output, each gated by a respective switch. A switch for the P-side output flows additional current to charge integrator 308 while sensor electrode 318 is drawing current from charge integrator 308. A switch for the N-side output draws additional current from charge integrator 308 while sensor electrode 318 is sourcing current. The result of these operations is to modify the signal output by charge integrator 308 in order to "baseline" that signal.

The N-side output and P-side output do not necessarily output the same current to charge integrator 308. This difference may be caused by a difference in transistor characteristics, or for other reasons. To account for this difference, the switches for the P-side output and/or the N-side output are closed for an adjustable amount of time. The length of time over which the P-side switch is closed is indicated by the parameter "P_DUR" and the length of time over which the N-side switch is closed is indicated by the parameter "N_DUR." These parameters are determined by operating the current-mode baseline system 301 in calibration mode.

Input device may include multiple current mirrors 306 coupled to a single current conveyor core 304. Each current mirror 306 may be coupled to a different "channel," where the term "channel" refers to a receiver electrode with transcapacitive sensing or a sensor electrode for self-capacitive sensing. N_DUR and P_DUR parameters may be determined for each channel and/or for each capacitive pixel in calibration mode. N_DUR and P_DUR parameters may alternatively be determined for groups of channels. A channel grouping scheme is described in more detail below with respect to FIG. 5.

Figure 4B:
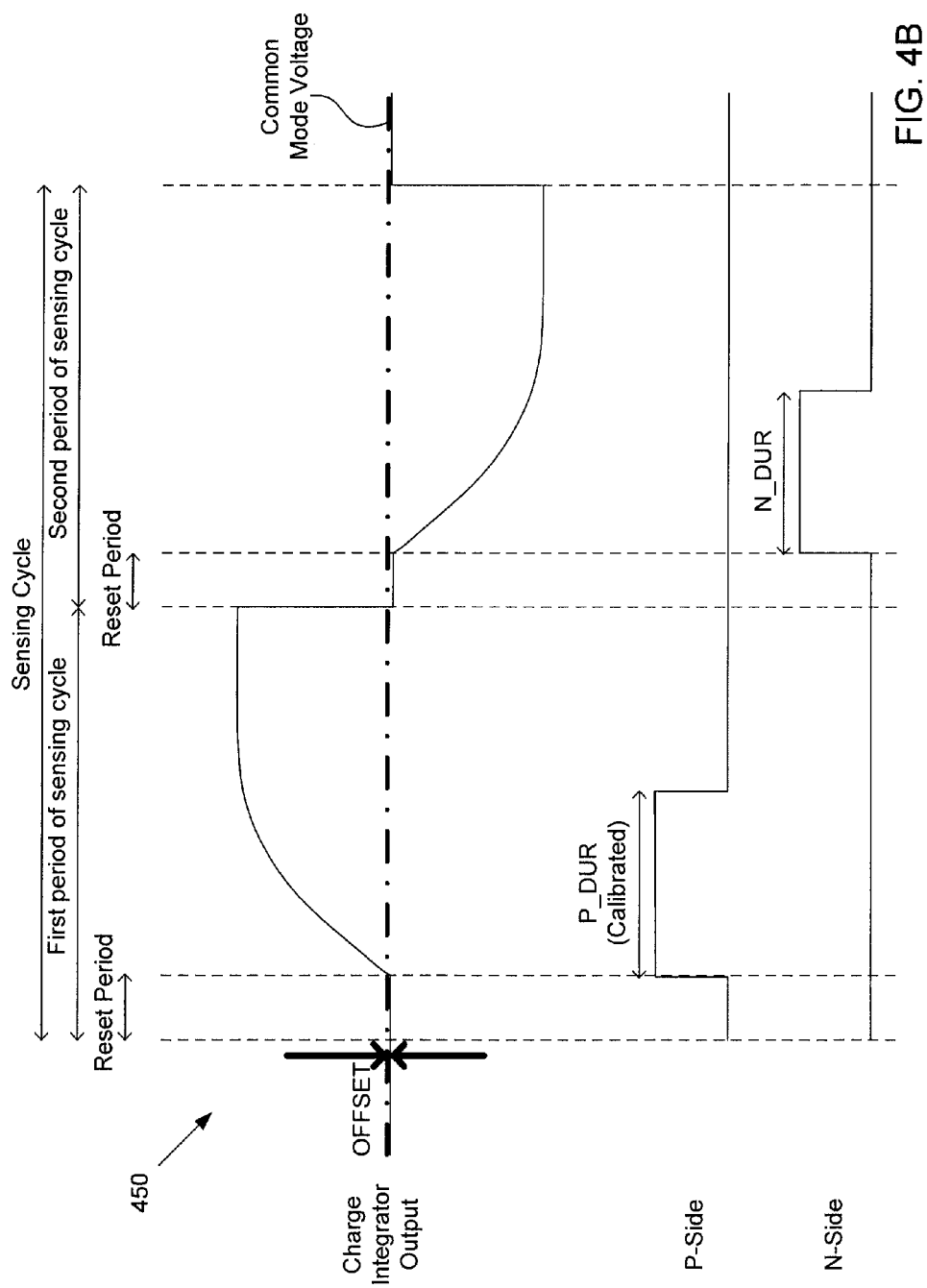

FIGS. 4A and 4B illustrate graph 400 and graph 450 that show the effect of varying the N_DUR and P_DUR parameters in the context of performing capacitive sensing, according to an example. Both graph 400 and graph 450 include three plots, labeled "charge integrator output," "P-side" and "N-side." A single sensing cycle is shown, over which a sensor electrode 318 is driven twice with opposite polarities. The P_DUR parameter is uncalibrated in graph 400 and is calibrated in graph 450. Because the P_DUR parameter has been calibrated, the offset in graph 450 is lower than in graph 400, which improves the dynamic range of the processing module 300.

Referring to FIGS. 3 and 4A together, during a reset period of a first period of the sensing cycle, reset switch 316 resets feedback capacitor 314. After the reset period, processing system 110 induces a signal on sensor electrode 318 for capacitive sensing. That signal causes a current flow from charge integrator 308, inducing charge integrator output as shown. The P-side switch of current mirror 306 is closed for time P_DUR and thus provides current from current mirror 306 to charge up the sensor capacitance. After time P_DUR, the P-side switch of current mirror 306 is open, thus preventing current from flowing from current mirror 306 to charge integrator 308 after that time. Charge integrator 308 continues to integrate charge from sensor electrode 318.

After the first period of the sensing cycle, a second period of the sensing cycle occurs. First, in a reset period, reset switch 316 resets feedback capacitor 314. After the reset period, processing system 110 induces a signal on sensor electrode 318 for capacitive sensing. That signal causes a current from sensor electrode 318, inducing charge integrator output as shown. The N-side switch of current mirror 306 is closed for time N_DUR to sink the charge dumped by the sensor capacitance. After time N_DUR, the N-side switch of current mirror 306 is open, thus preventing current from flowing to current mirror 306 from charge integrator 308 after that time.

Because FIG. 4A illustrates uncalibrated current-mode baseline correction, there is an offset between the common-mode—voltagethe average voltage at the end of each of the half sensing cycles—and the middle voltage that the charge integrator 308 is reset to when reset switch 316 closes. This offset manifests as a reduction in dynamic range of the processing module 300.

FIG. 4B depicts a graph 450 that illustrates operation of processing module 300 after the P_DUR and N_DUR values have been calibrated in calibration mode. Operation is similar as with respect to FIG. 4A except that P_DUR is calibrated and is longer in FIG. 4B than in FIG. 4A. This longer length results in a lower amplitude output of charge integrator 308 during the first period of the sensing cycle, which lowers the common mode voltage to be closer to the middle voltage to which charge integrator 308 is reset when reset switch 316 closes. This reduces the offset described above, which improves the dynamic range of processing module 300.

Note that the P_DUR and N_DUR parameters may correct for a mismatch between an N-type transistor and a P-type transistor of current mirror 306. Specifically, because a mismatch would result in different amounts of current flowing through those transistors, adjusting the duration over which those transistors provide current to charge integrator 308 corrects for this mismatch. The P_DUR and N_DUR parameters may also correct for mismatches induced by other elements such as capacitance mode baseline capacitor 320, charge integrator 308, or other elements.

Note also that the parameters P_DUR and N_DUR may be stored as a percentage of a respective period of a sensing cycle. In one example, P_DUR may be 30%, which represents 30% of the time from beginning one reset of feedback capacitor 314 via reset switch 316 to beginning the next reset of feedback capacitor 314 via reset switch 316. These parameters may be stored in registers accessible to control circuitry for controlling the switches for P-type and N-type sides of current mirror 306.

Figure 5:
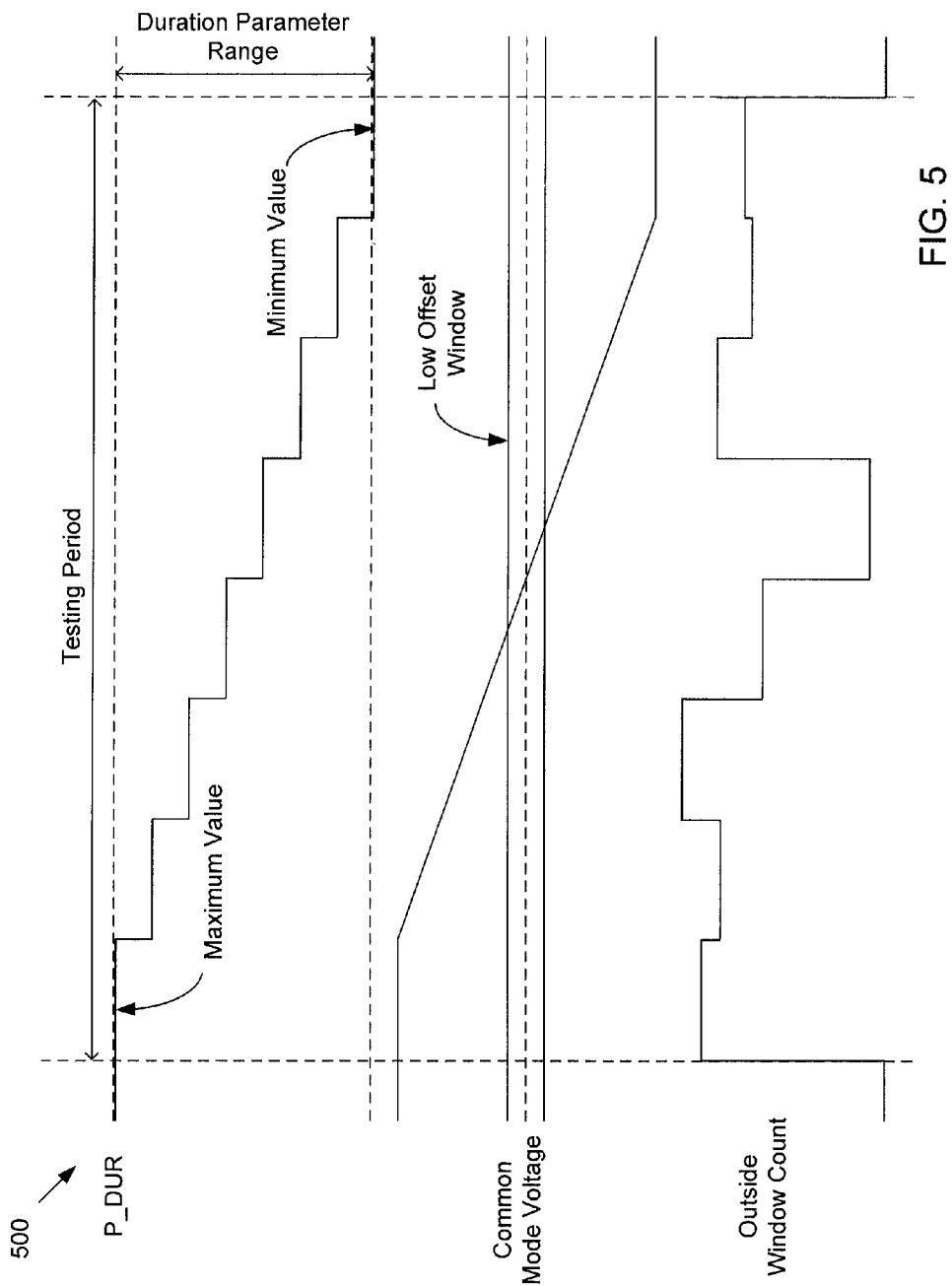
FIG. 5 is a graph that illustrates a technique for calibrating the processing module of FIG. 3, according to an example.

FIG. 5 is a graph 500 that illustrates a technique for calibrating processing module 300 of FIG. 3, according to an example. The graph 500 includes several plots that illustrate the calibration technique: a plot labeled P_DUR, a plot labeled common-mode voltage, and a plot labeled "outside window count."

To calibrate processing module 300, calibration module 310 holds N_DUR constant and varies P_DUR within a duration parameter range during a testing period. In the example illustrated in FIG. 5, calibration module 310 varies P_DUR by sweeping P_DUR from a maximum value to a minimum value. For each value of P_DUR, calibration module 310 causes sensor electrode 318 to be driven with a signal for multiple sensing cycles. Each period of a sensing cycle in which sensor electrode 318 is driven with a signal, charge integrator 308 integrates charge received at the inverting input of operational amplifier 312 and outputs the integrated value to calibration module 310. For each sensing cycle, calibration module 310 calculates the average value over that sensing cycle received from the charge integrator 308 (the "common mode voltage") and detects whether the common mode voltage is within a "low offset window." The average value is the average of two values: the output voltage at the end of the first period of the sensing cycle and the output voltage at the end of the second period of the sensing cycle. The low offset window is a range of values within which the offset described with reference to FIGS. 4A-4B is deemed to be low enough such that processing module 300 is considered to be calibrated.

Note that for each value of P_DUR, the sensor electrode 318 is driven a number of times (i.e., for multiple sensing cycles). The graph labeled "outside window count" indicates a count of the number of times that the common mode voltage is outside of the low offset window for any particular value of P_DUR. The reason this measurement is performed multiple times for each value of P_DUR is to account for random variations induced by noise. Although described as being performed a number of times for each value of P_DUR, in some embodiments, the measurement may be performed only once for each value of P_DUR, in which case the outside window count would be only 0 or 1.

After varying P_DUR within the duration parameter range and taking the associated measurements, calibration module 310 identifies the value of P_DUR for which the outside window count is the lowest. At this lowest point, the number of times that the common mode voltage falls outside of the low offset window is the lowest, meaning that for that value of P_DUR, the common mode voltage is within the low offset window and is thus calibrated. Once the calibrated values of N_DUR and P_DUR are obtained, calibration module 310 stores these values in a storage area such as registers or the like, for use during the sensing mode.

Note that although P_DUR is described as being varied herein, while N_DUR is held constant, N_DUR may instead be varied while P_DUR is constant. Alternatively, both P_DUR and N_DUR may be varied. Additionally, although P_DUR is shown as varying linearly from one extreme to the other, P_DUR may be varied in a different manner. A search such as a binary search may also be performed, which would take advantage of the fact that common mode voltage varies proportionately to P_DUR (or N_DUR). In some embodiments, the minimum and maximum values over which P_DUR (or N_DUR) vary are 15% and 45% of the period of the sensing cycle illustrated in FIG. 3 (i.e., the period from beginning one reset period to beginning the next reset period).

N_DUR and P_DUR parameters may alternatively or additionally be determined for groups of channels. The calibration technique illustrated in FIG. 5 would be performed for multiple channels and the results would combined via a logical OR operation. More specifically, a particular duration parameter would be varied and processing system 110 would drive the different sensor electrodes 318 of the different channels with a signal for multiple cycles for each value of the duration parameter. For each cycle, calibration module 310 would compare the common mode voltage for that cycle to a low offset window, outputting a "0" if the common mode voltage falls within that window and outputting a "1" if the common mode voltage falls outside of that window. Calibration module 310 would perform a logical OR operation for each cycle and each channel. If the common mode voltage falls outside of the low offset window for any channel, then the result of this logical OR operation would be a "1" and if the common mode voltage falls within the low offset window for all channels, then the result of this logical OR operation would be a "0." Calibration module 310 would record the count of the number of logical 1's and would determine the calibrated value for the duration parameter as the duration parameter associated with the lowest count. Channels could be grouped together in any way. In one example, channels near a power supply would be expected to be similarly affected by power supply-related noise and could be calibrated together with the technique just described.

Figure 6:
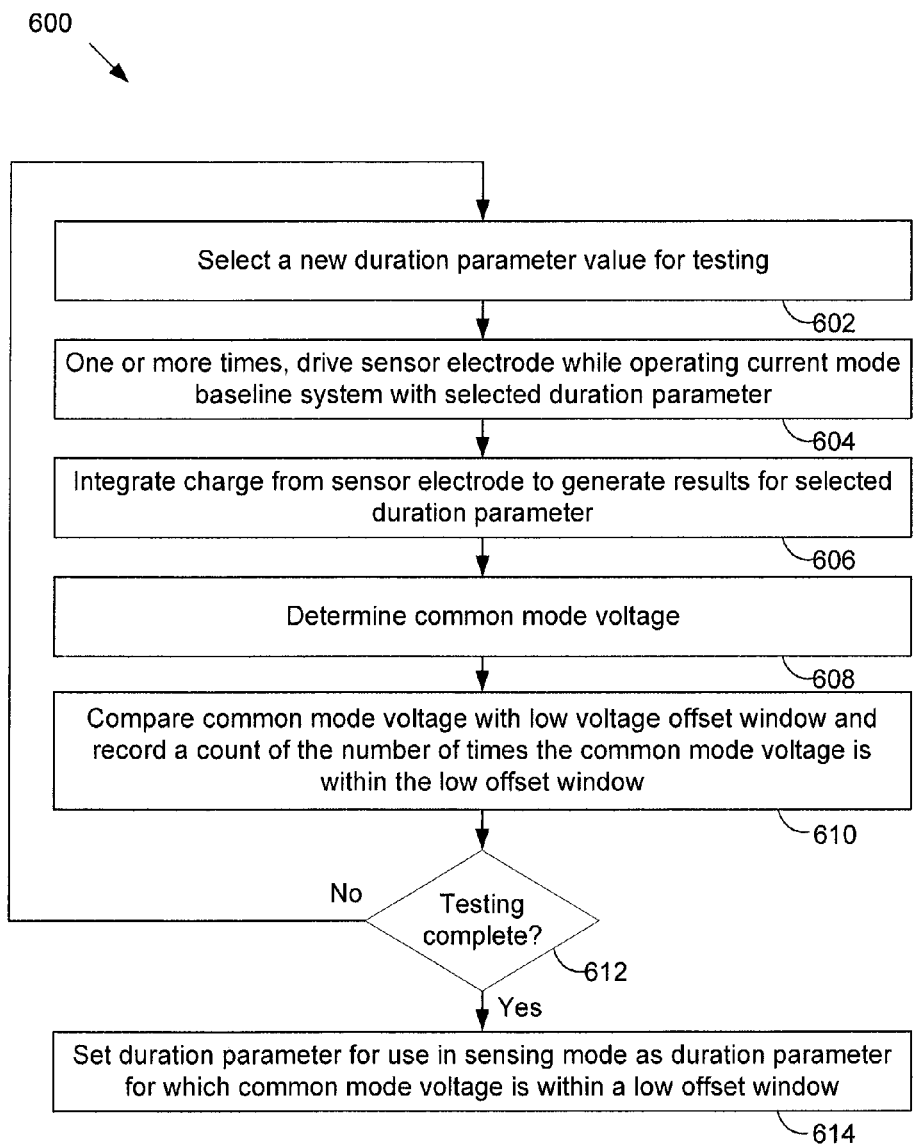
FIG. 6 is a flow chart of a method for operating the processing module in calibration mode, according to an example.

FIG. 6 is a flow chart of a method 600 for operating the processing module 300 in calibration mode, according to an example. Although the method is described in conjunction with the system described with respect to FIGS. 1-5, persons skilled in the art will understand that any system configured to perform the method steps, in various technically feasible alternative orders, falls within the scope of the present disclosure.

As shown, the method 600 starts at step 602, where calibration module 310 selects a new duration parameter value for testing. The parameter may be either the N_DUR parameter or the P_DUR parameter described above. Calibration module 310 may select this duration parameter as part of a parameter variation scheme, such as varying the duration parameter linearly, varying the duration parameter to performing a search, and the like.

At step 604, processing system 110 drives the sensor electrode 318 for capacitive sensing a number of times with the selected duration parameter. At step 606, charge integrator 308 integrates charge received from sensor electrode 318 each time sensor electrode 318 is driven for capacitive sensing. At step 608, calibration module 310 determines the common mode voltage for each sensing period in which the sensor electrode is driven. At step 610, calibration module 310 compares the common mode voltage with the low offset window and records a count of the number of times that the common mode voltage is within the low offset window.

At step 612, calibration module 310 determines whether testing is complete. Testing may be complete when all values within a particular range of values for the duration parameter have been tested. Testing may also be complete when a binary search has found a duration parameter for which the integrated charge is within the low offset window. If testing is not complete, then the method 600 returns to step 602 and if testing is complete, then the method 600 proceeds to step 614. At step 614, calibration module 310 sets the duration parameter for use in sensing mode as the duration parameter for which the common mode voltage is within a low offset window.

Figure 7:
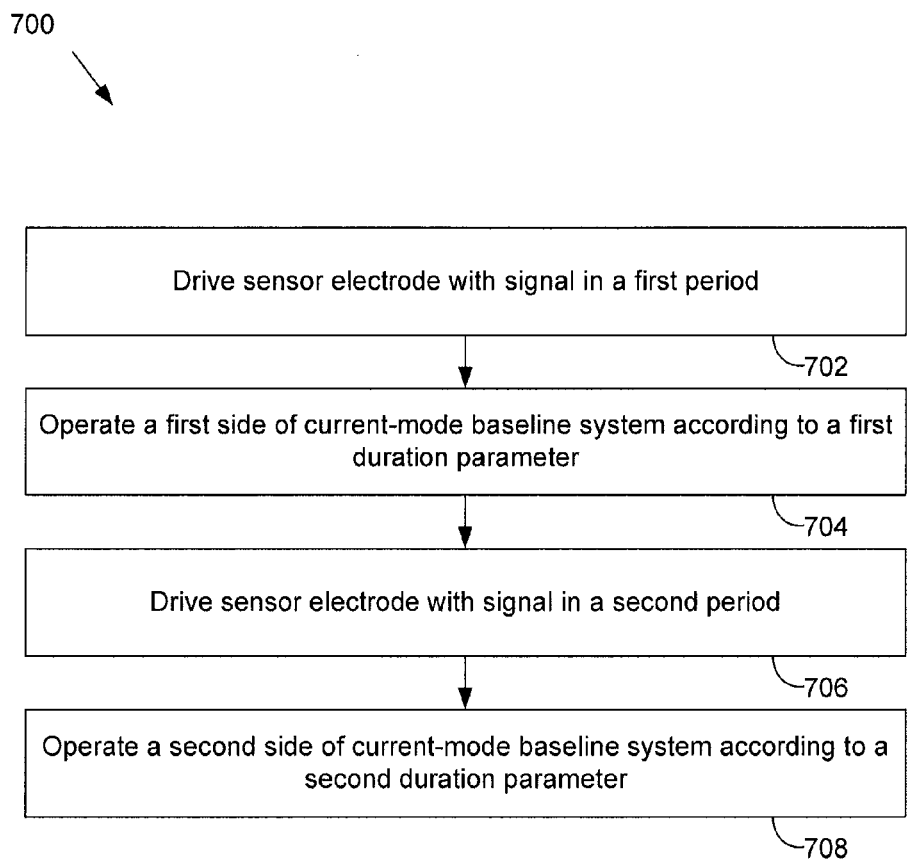
FIG. 7 is a flow chart of a method for operating the processing module in sensing mode, according to an example.

FIG. 7 is a flow chart of a method 700 for operating the processing module 300 in sensing mode, according to an example. Although the method is described in conjunction with the system described with respect to FIGS. 1-5, persons skilled in the art will understand that any system configured to perform the method steps, in various technically feasible alternative orders, falls within the scope of the present disclosure.

As shown, the method 700 starts at step 702, where processing system 110 drives a sensor electrode 318 for capacitive sensing in a first period. At step 704, during the first period, calibration module 310 operates a first side of a current-mode baseline system 301 according to a first duration parameter (for example, N_DUR). At step 706, processing system 110 drives a sensor electrode 318 for capacitive sensing in a second period. At step 708, during the second period, calibration module 310 operates a second side of the current-mode baseline system 301 according to a second duration parameter (for example, N_DUR).

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for calibrating current-mode baseline operations, the processing system comprising:
   a charge integrator coupled to a sensor electrode that is configured to be driven with a sensing signal for capacitive sensing during a cycle of the sensing signal, the charge integrator configured to output a common mode voltage that is based, at least in part, on output of the charge integrator over the cycle of the sensing signal;
   a baseline system configured to apply an offset to the common mode voltage to correct for baseline capacitance in the processing system, wherein the baseline system comprises a current mirror configured to apply the offset by:
      flowing first current to the charge integrator based, at least in part, on closure of a first switch, for a first duration during a first period of the cycle of the sensing signal, and
      flowing second current to the charge integrator based, at least in part, on closure of a second switch, for a second duration during a second period of the cycle of the sensing signal; and
   a calibration unit configured to determine values for one or more of the first duration and the second duration at which the common mode voltage of the charge integrator is within a threshold range.

2. The processing system of claim 1, wherein the calibration unit is configured to determine the values for the first duration and the second duration by:
   for each cycle of a plurality of cycles in which the sensor electrode is driven for capacitive sensing, varying one or more of the first duration and the second duration; and
   identifying a combination of first duration and second duration for which the common mode voltage is within the threshold range.

3. The processing system of claim 2, wherein the calibration unit is configured to vary either of the first duration during the first period of the cycle or the second duration during the second period of the cycle.

4. The processing system of claim 2, further comprising:
   a signal generator configured to drive the sensor electrode for capacitive sensing a number of times for each combination of first duration and second duration, wherein the calibration unit is further configured to determine the values for the first duration and the second duration by:
      for each cycle of the plurality of cycles, recording a count of a number of times that the common mode voltage is not within the threshold range, and
      identifying a combination of first duration and second duration for which an associated count of the number of times that the common mode voltage is not within the threshold range is lower than for any other combination of first duration and second duration.

5. The processing system of claim 1, wherein the baseline system further comprises:
   a current conveyor configured to generate a reference current, wherein the first current and the second current are based on the reference current.

6. The processing system of claim 1, wherein the baseline system is configured to:
   flow the first current through a N-type metal-oxide-semiconductor (NMOS) transistor; and
   flow the second current through a a P-type metal-oxide-semiconductor (PMOS) transistor.

7. The processing system of claim 1, wherein:
   the calibration unit is configured to determine the common mode voltage by:
      sampling an output of the charge integrator during the first period to determine a first sample;
      sampling the output of the charge integrator during the second period to determine a second sample; and
      calculating the common mode voltage based on averaging the first sample and the second sample.

8. The processing system of claim 1, further comprising:
   a second charge integrator coupled to a second sensor electrode that is configured to be driven with a second sensing signal for capacitive sensing during a cycle of the second sensing signal, the charge integrator configured to output a second common mode voltage that is based, at least in part, on the output of the second charge integrator over the cycle of the second sensing signal; and a second current mirror configured to apply an offset to the common mode voltage to correct for baseline capacitance in the processing system by:

flowing third current to the second charge integrator for the first duration during a first period of a cycle of the second sensing signal, and flowing fourth current to the second charge integrator for the second duration during a second portion of the cycle of the second sensing signal, wherein the calibration unit is configured to determine values for the first duration and the second duration based on the second common mode voltage of the second charge integrator and the common mode voltage of the first charge integrator.

9. A method for calibrating current-mode baseline operations, the method comprising:

driving a sensor electrode coupled to a charge integrator with a sensing signal to obtain a common mode voltage that is based, at least in part, on output of the charge integrator over a cycle of the sensing signal;

applying an offset, by a current mirror, to the common mode voltage to correct for baseline capacitance by:

flowing first current to the charge integrator for a first duration during a first period of the cycle of the sensing signal; and flowing second current to the charge integrator for a second duration during a second period of the cycle of the sensing signal; and determining values for one or more of the first duration and the second duration at which the common mode voltage of the charge integrator is within a threshold range.

10. The method of claim 9, wherein determining the values for the first duration and the second duration comprises:

for each cycle of a plurality of cycles in which the sensor electrode is driven for capacitive sensing, varying one or more of the first duration and the second duration; and identifying a combination of first duration and second duration for which the common mode voltage is within the threshold range.

11. The method of claim 10, further comprising varying either of the first duration during the first period of the cycle of the sensing signal or the second duration during the second period of the cycle.

12. The processing system of claim 10, further comprising:

driving the sensor electrode for capacitive sensing a number of times for each combination of first duration and second duration, wherein determining the values for the first duration and the second duration comprises:

for each cycle of the plurality of cycles, recording a count of a number of times that the common mode voltage is not within the threshold range, and identifying a combination of first duration and second duration for which an associated count of the number of times that the common mode voltage is not within the threshold range is lower than for any other combination of first duration and second duration.

13. The method of claim 9, wherein:

flowing the first current comprises closing a first switch of the current mirror to flow the first current to the charge integrator; and flowing the second current comprises closing a second switch of the current mirror to flow the second current to the charge integrator.

14. The method of claim 13, further comprising:

generating a reference current by a current conveyor, wherein the first current and the second current are based on the reference current generated by a current conveyor.

15. The method of claim 13, wherein:

flowing the first current comprises flowing the first current through a N-type metal-oxide-semiconductor (NMOS) transistor; and flowing the second current comprises flowing the second current through a P-type metal-oxide-semiconductor (PMOS) transistor.

16. The method of claim 9, further comprising:

determining the common mode voltage by:

sampling an output of the charge integrator during the first period to determine a first sample;

sampling the output of the charge integrator during the second period to determine a second sample; and calculating the common mode voltage based on averaging the first sample and the second sample.

17. The method of claim 9, further comprising:

driving a second sensor electrode coupled to a second charge integrator with a second sensing signal to obtain a second common mode voltage that is based, at least in part, on the output of the second charge integrator over a cycle of the second sensing signal;

applying an offset to the second common mode voltage to correct for baseline capacitance by:

flowing third current to the second charge integrator for the first duration during a first period of the cycle of the second sensing signal; and flowing fourth current to the second charge integrator for the second duration during a second portion of the cycle of the second sensing signal; and determining values for the first duration and the second duration based, at least in part, on the second common mode voltage of the second charge integrator and the common mode voltage of the first charge integrator.

18. An input device, comprising:

a plurality of sensor electrodes configured to be driven with a sensing signal for capacitive sensing during a cycle of sensing signal; and a processing system including:

a charge integrator coupled to a sensor electrode of the plurality of sensor electrodes configured to output a common mode voltage that is based, at least in part, on the output of the charge integrator over the cycle of the sensing signal;

a baseline system configured to apply an offset to the common mode voltage to correct for baseline capacitance, wherein the baseline system comprises a current mirror configured to apply the offset by:

flowing first current to the charge integrator for a first duration during a first period of the cycle of the sensing signal, and flowing second current to the charge integrator for a second duration during a second period of the cycle of the sensing signal; and a calibration unit configured to determine values for one or more of the first duration and the second duration at which the common mode voltage of the charge integrator is within a threshold range.

19. The input device of claim 18, wherein the calibration unit is configured to determine the values for the first duration and the second duration by:
for each cycle of a plurality of cycles in which the sensor electrode is driven for capacitive sensing, varying one or more of the first duration and the second duration; and
identifying a combination of first duration and second duration for which the common mode voltage is within the threshold range.

* * * * *